(12) United States Patent
Brown et al.

(10) Patent No.: US 7,298,341 B2
(45) Date of Patent: Nov. 20, 2007

(54) WHEEL ARCH INCLUDING AN ANTENNA

(75) Inventors: Andrew R. Brown, Plymouth, MI (US); Xavier Huchard, Pont du Chateau (FR); David L. Juzswik, Commerce, MI (US); Xing Ping Lin, Orchard Lake, MI (US); Mathieu Tupinier, Chamalieres (FR)

(73) Assignees: Michelin Recherche et Technique S.A., Granges-Paccot (CH); TRW Automotive US, LLC, Farmington Hills, MI (US)

( * ) Notice: Subject to any disclaimer, the term of this patent is extended or adjusted under 35 U.S.C. 154(b) by 13 days.

(21) Appl. No.: 11/063,239

(22) Filed: Feb. 22, 2005

(65) Prior Publication Data
US 2005/0242938 A1 Nov. 3, 2005

(30) Foreign Application Priority Data
Feb. 27, 2004 (FR) .................................. 04 02046

(51) Int. Cl.
*H01Q 1/32* (2006.01)
(52) U.S. Cl. ..................................... 343/711
(58) Field of Classification Search ................. 343/711, 343/712, 713; 340/58; 524/543; 342/70
See application file for complete search history.

(56) References Cited

U.S. PATENT DOCUMENTS

| 4,609,905 | A  |   | 9/1986  | Uzzo                    |
|-----------|----|---|---------|-------------------------|
| 5,926,142 | A  | * | 7/1999  | Rathgeb et al. ............. 343/713 |
| 6,430,484 | B1 | * | 8/2002  | Takamura et al. ............ 701/29 |
| 6,778,143 | B2 | * | 8/2004  | Morita ........................ 343/713 |
| 6,972,671 | B2 | * | 12/2005 | Normann et al. ........... 340/442 |
| 6,985,117 | B2 | * | 1/2006  | Voigtlaender et al. ...... 343/711 |
| 2002/0158805 | A1 | * | 10/2002 | Turnbull et al. ............ 343/713 |
| 2004/0227663 | A1 | * | 11/2004 | Suzuki et al. ................. 342/70 |
| 2005/0119400 | A1 | * | 6/2005  | Ortmeier et al. ............ 524/543 |

FOREIGN PATENT DOCUMENTS

GB 2 358 949 8/2001
WO WO 92/21161 A 11/1992

* cited by examiner

*Primary Examiner*—Huedung Mancuso
(74) *Attorney, Agent, or Firm*—Jacox, Meckstroth & Jenkins

(57) ABSTRACT

The invention provides a vehicle wheel arch (18) of the type including an antenna (20) for interacting with a device (22) carried by an assembly (12) of a wheel (14) and a tire (16). The wheel arch includes a shield (24) overlying the antenna (20) beside the radially-inner face of the wheel arch (18), said shield (24) being suitable for retaining matter (26) at a certain distance from the antenna (20).

7 Claims, 1 Drawing Sheet

WHEEL ARCH INCLUDING AN ANTENNA

CROSS-REFERENCE TO RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Figure 1:
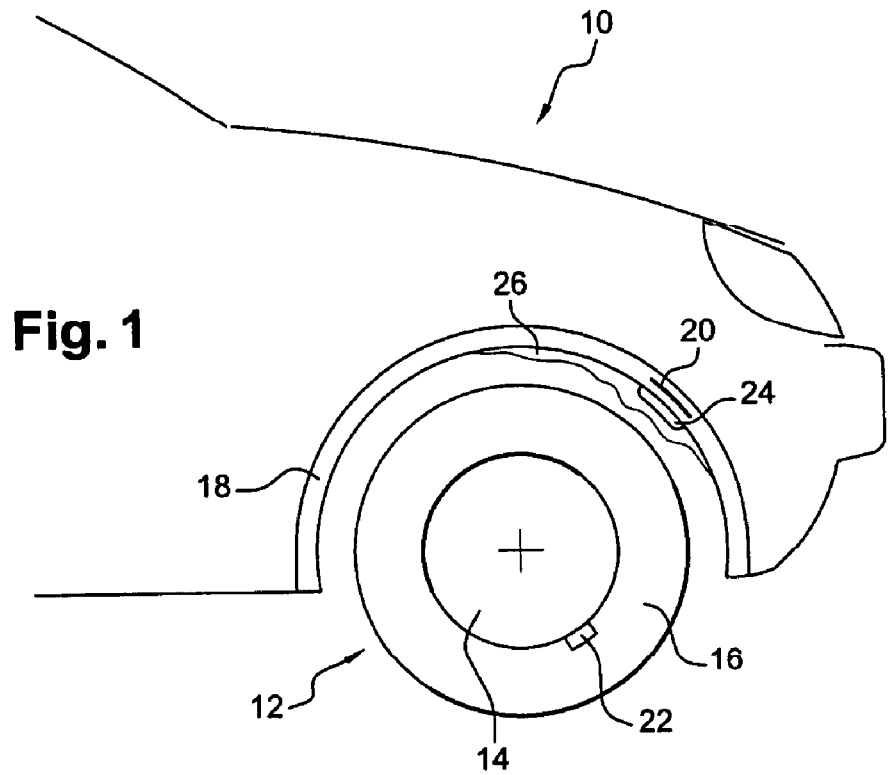

1. Field of the Invention
2. Description of the Related Art

The present invention relates to a vehicle wheel arch of the type including an antenna for interacting with a device carried by an assembly of a wheel and a tire.

There is a trend with car manufacturers to fit the wheels or the tires of vehicles with devices serving to provide information about the tires to a computer of the vehicle.

Amongst possible devices, there can be found, for example, pressure sensors, temperature sensors, and devices for identifying tires.

It is known to use radio technology to put the device into communication with the computer. The same technology can also be used for transmitting energy to the device from a fixed point of the vehicle.

For this purpose, each wheel arch is provided with an antenna connected by electrical cables to the computer and/or to an electricity power supply, and the device is itself also provided with an antenna.

The present invention is implemented in such a context.

BRIEF SUMMARY OF THE INVENTION

When making the necessary tests on a wheel arch made of plastics material and including an integrated antenna, the inventors of the present invention found, surprisingly, that radio transmission could be interrupted in the event of matter, in particular conductive matter, becoming deposited in the vicinity of the wheel arch antenna.

Thus, during such testing, the radially-inner face of the wheel arch became unexpectedly covered in a fine layer of ice containing salt particles, and that suddenly prevented any communication with the device.

Furthermore, the inventors observed that it suffices to move those matter and the antenna apart, to enable communication with the device to be reestablished.

It was thus discovered, surprisingly, that it is not essential to prevent material from being deposited, all that is essential is to keep the deposit and the antenna far enough apart to enable the antenna to communicate in satisfactory manner with the device.

The invention thus seeks to provide a wheel arch of the above-specified type enabling data to be transmitted between the device and the antenna carried by the corresponding wheel arch optimally and without running any risk of being disturbed by undesirable deposits of material.

To this end, the invention provides a vehicle wheel arch of the type including an antenna for interacting with a device carried by an assembly of a wheel and a tire, the wheel arch including a shield overlying the antenna beside the radially-inner face of the wheel arch, said shield being suitable for retaining matter at a certain distance from the antenna.

The person skilled in the art will be able, e.g. by successive approximations, to determine the distance that is the most appropriate as a function of the characteristics of the antennas, the wheel arch, and the device, and also as a function of the desired performance target.

By means of the invention, the antenna shield prevents disturbing elements being deposited in the vicinity of the antenna, which has the effect of improving radio transmission between the device and the antenna carried by the wheel arch.

During testing, the inventors also observed that radio transmission between the device and the antenna carried by the corresponding wheel arch is very sensitive to the angular positioning of the antenna on the wheel arch.

Thus, for a front wheel arch, it is preferable for the antenna to be placed in such a manner that the line segment connecting the center of the antenna to the center of the wheel makes an angle of substantially 45° with a horizontal plane.

In addition, for a rear wheel arch, it is preferable for the antenna to be located so that the line segment connecting the center of the antenna to the center of the wheel is substantially horizontal. If the wheel arch is not large enough for said line segment to be substantially horizontal, it is advantageous to place the antenna at one end of the wheel arch.

Optionally, the antenna is carried by the front portion of the wheel arch.

This positioning is particularly advantageous for a front wheel arch, because it moves the antenna and different metallic structural parts of the vehicle apart.

A wheel arch of the invention may also comprise one or more of the following characteristics;

the antenna is embedded in the thickness of the wheel arch;

the antenna is fitted against a face of the wheel arch, preferably its radially-outer face;

the wheel arch is made of a non-conductive material;

the shield is fitted to the wheel arch; and the shield is molded integrally with the wheel arch.

The invention also provides an assembly comprising a wheel arch of the invention as defined above together with a device carried by an assembly of a wheel and a tire.

BRIEF DESCRIPTION OF THE SEVERAL VIEWS OF THE DRAWING(S)

Figure 2:
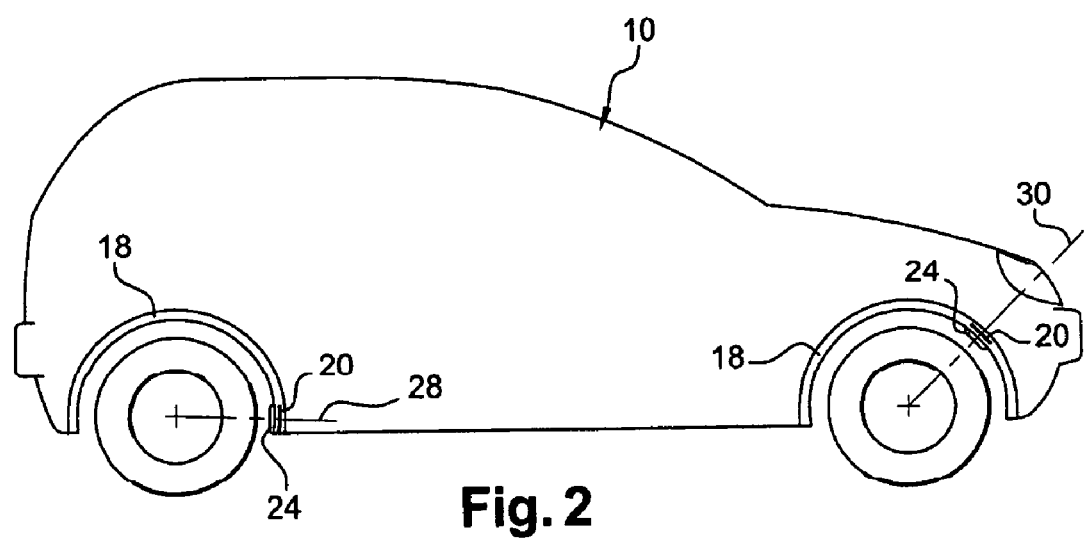

The invention will be better understood on reading the following description given purely by way of example and made with reference to the accompanying drawing, in which:

FIG. 1 is a detailed diagram of the front of a vehicle seen from the side, and provided with a wheel arch of the invention; and FIG. 2 is a general view of a vehicle provided with a wheel arch of the invention.

DETAILED DESCRIPTION OF THE INVENTION

FIG. 1 shows the front of a vehicle given overall reference 10. The vehicle 10 is a car in the example shown, and it has mounted thereon assemblies each constituted by a wheel 14 and a tire 16, with only one mounted assembly 12 (a front-right assembly) being shown in FIG. 1.

The mounted assembly 12 is included in the car 10 under a wheel arch 18 of small thickness that is conventionally obtained by molding a plastics material.

The wheel arch 18 includes an antenna 20 for interacting with a device 22 carried by the wheel 14. The antenna 20 is embedded in the thickness of the wheel arch. Alternatively, it may be fitted against one of the faces of the wheel arch 18.

The device 22 is a pressure sensor 22 fixed to the wheel 14 by conventional means. The pressure sensor includes transmitter and/or receiver means for enabling data to be exchanged with the antenna 20.

The wheel arch 18 includes a shield 24 covering the antenna beside the radially-inner face of the wheel arch. This shield 24 may be fitted to the wheel arch or it may be molded integrally therewith.

The shield 24 is suitable for retaining material 16 such as snow, ice, mud, or dead leaves at a certain distance apart from the antenna 20 so as to improve data transmission between the pressure sensor 22 and the antenna 20. In particular, matter containing conductive particles, like salt water, disrupt a lot the transmission.

The inventors of the present invention have discovered that the optimum distance between the shield 24 and the antenna is about 2 centimeters (cm) so as to optimize data transmission for predetermined energy consumption.

The wheel arch 18 and the shield 24 are preferably made of non-conductive material.

It is advantageous for the antennas 20 to be carried by the front portions of the wheel arches 18 of the vehicle 10, as shown in FIG. 2. Because of the direction of rotation of the wheels, matter 26 tends to become deposited on the rear portions of the wheel arches 18.

The rear wheel arch antenna is disposed in such a manner that the line segment 28 connecting the center of the antenna to the center of the wheel extends substantially horizontally.

For the front wheel arch, the antenna is placed in such a manner that the line segment 30 connecting the center of the antenna to the center of the wheel forms an angle of substantially 45° relative to a horizontal plane.

The invention claimed is:

1. A vehicle wheel arch of the type including an antenna for interacting with a device carried by an assembly of a wheel and a tire, said wheel arch including a shield overlying said antenna beside the radially-inner face of said wheel arch, said shield retaining matter at a certain distance separated away from said antenna and protecting said antenna from physical damage from said matter to enable said antenna to communicate in satisfactory manner with said device; said wheel arch being non-conductive and comprising a thickness and a radially-outer face, said antenna being embedded in said thickness of at least one of a front wheel arch or a rear wheel arch or fitted to a radially-outer face of said at least one of said front wheel arch or said rear wheel arch.

2. The wheel arch according to claim 1, in which said wheel arch is said front wheel arch, said antenna being located in such a manner that a line segment connecting a center of said antenna to said center of said wheel makes an angle of substantially 45° with a horizontal plane.

3. The wheel arch according to claim 1, in which said wheel arch is said rear wheel arch, said antenna being placed in such a manner that a line segment connecting a center of said antenna to said center of said wheel is substantially horizontal.

4. The wheel arch according to claim 1, in which said wheel arch is said rear wheel arch, said antenna is placed at one end of said rear wheel arch.

5. The wheel arch according to claim 2, in which said antenna is carried by a front portion of said front wheel arch.

6. The wheel arch according to claim 1, in which said shield is molded integrally with said at least one of said front wheel arch or said rear wheel arch.

7. An assembly comprising a wheel arch according to claim 1 and a device carried by an assembly of a wheel and a tire.

* * * * *